US011750403B2

(12) United States Patent
Sastry et al.

(10) Patent No.: US 11,750,403 B2
(45) Date of Patent: *Sep. 5, 2023

(54) ROBUST STATE SYNCHRONIZATION FOR STATEFUL HASH-BASED SIGNATURES

(71) Applicant: Intel Corporation, Santa Clara, CA (US)

(72) Inventors: Manoj Sastry, Portland, OR (US); Rafael Misoczki, Hillsboro, OR (US); Jordan Loney, Hillsboro, OR (US); David M. Wheeler, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,148

(22) Filed: Jul. 29, 2022

(65) Prior Publication Data

US 2022/0368537 A1    Nov. 17, 2022

Related U.S. Application Data

(63) Continuation of application No. 16/830,844, filed on Mar. 26, 2020, now Pat. No. 11,438,172.

(51) Int. Cl.
*G06F 21/72* (2013.01)
*H04L 9/32* (2006.01)

(52) U.S. Cl.
CPC .......... *H04L 9/3247* (2013.01); *G06F 21/72* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 10,339,106 B2 | 7/2019 | Vijayan et al. | |
| 2020/0045028 A1 | 2/2020 | Norum | |
| 2020/0403803 A1* | 12/2020 | Werner | H04L 9/3242 |

FOREIGN PATENT DOCUMENTS

| | | |
|---|---|---|
| CN | 113452527 A | 9/2021 |
| EP | 3886360 A | 9/2021 |

OTHER PUBLICATIONS

Cooper et al., "Recommendation for Stateful Hash-Based Signature Schemes", Dec. 11, 2019, National Institute of Science and Technology (NIST), NIST Special Publication (SP) 800-208, pp. 1-55. (Year: 2019).*

(Continued)

*Primary Examiner* — Nelson S. Giddins
(74) *Attorney, Agent, or Firm* — Jaffery Watson Mendonsa & Hamilton LLP

(57) ABSTRACT

In one example an apparatus comprises a computer readable memory, a signing facility comprising a plurality of hardware security modules, and a state synchronization manager comprising processing circuitry to select, from the plurality of hardware security modules, a set of hardware security modules to be assigned to a digital signature process, the set of hardware security modules comprising at least a first hardware security module and a second hardware module, and assign a set of unique state synchronization counter sequences to the respective set of hardware security modules, the set of state synchronization counter sequences comprising at least a first state synchronization counter sequence and a second state synchronization counter sequence. Other examples may be described.

15 Claims, 13 Drawing Sheets

(56) References Cited

OTHER PUBLICATIONS

Silvio Dragone, et al., "Stateless Cryptography for virtual environments", Jan. 2014, IBM Research, IBM Jousrnal of Research and Development, vol. 58, No. 1, pp. 1-11. (Year: 2014).*
Marks Larry, et al., "Stateful Hash-based Signatures Public Comments on Misuse Resistance—Request Issued Feb. 4, 2019", Apr. 1, 2019, National Institute of Standards and Technology, pp. 1-32. (Year: 2019).*
Extended European Search Report for EP Application No. 20208930.6, dated Mar. 11, 2021, 9 pages.
Marks Larry, "Stateful Hash-Based Signatures Public Comments on Misuse Resistance-Request", Issued Feb. 4, 2019, XP055779336, 32 pages.
Visegrady, et al., "Stateless Cryptography for virtual environments", IBM Journal of Research and Development, vol. 25, No. 1, Jan. 1, 2014, XP055779327, 12 pages.

* cited by examiner

ROBUST STATE SYNCHRONIZATION FOR STATEFUL HASH-BASED SIGNATURES

CLAIM TO PRIORITY

This application is a continuation of and claims the benefit of and priority to U.S. application Ser. No. 16/830,844, entitled ROBUST STATE SYNCHRONIZATION FOR STATEFUL HASH-BASED SIGNATURES, by Manoj Sastry, et al., filed Mar. 26, 2020, the entire contents of which are incorporated herein by reference.

BACKGROUND

Subject matter described herein relates generally to the field of computer security and more particularly to code signing facilities for post-quantum cryptography secure hash-based signatures, including but not limited to the Extended Merkle Signature Scheme (XMSS) and Leighton/Micali Signature (LMS) hash-based signing and verification algorithms.

Existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. As a result, there are efforts underway in the cryptography research community and in various standards bodies to define new standards for algorithms that are secure against quantum computers.

Accordingly, techniques to manage the proper application of post-quantum signature schemes may find utility, e.g., in computer-based communication systems and methods.

BRIEF DESCRIPTION OF THE DRAWINGS

The detailed description is described with reference to the accompanying figures.

DETAILED DESCRIPTION

Figure 1A:
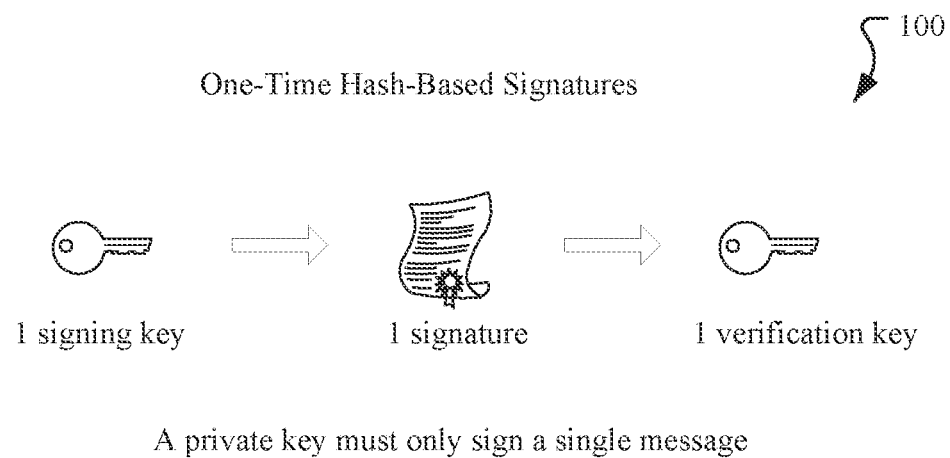
FIGS. 1A and 1B are schematic illustrations of a one-time hash-based signatures scheme and a multi-time hash-based signatures scheme, respectively.

Described herein are exemplary systems and methods to implement robust state synchronization for stateful hash-based signatures. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

As described briefly above, existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. Hash-based signatures, on the other hand, are expected to withstand attacks by quantum computers. One example of hash-based signature scheme is the eXtended Merkle Signature Scheme (XMSS). As used herein, the term XMSS shall refer to both the XMSS scheme and the XMSS-MT scheme.

An XMSS signature process implements a hash-based signature scheme using a one-time signature scheme such as a Winternitz one-time signature (WOTS) or a derivative there of (e.g., WOTS+) in combination with a secure hash algorithm (SHA) such as SHA2-256 as the primary underlying hash function. In some examples the XMSS signature/verification scheme may also use one or more of SHA2-512, SHA3-SHAKE-256 or SHA3-SHAKE-512 as secure hash functions. XMSS-specific hash functions include a Pseudo-Random Function (PRF), a chain hash (F), a tree hash (H) and message hash function ($H_{msg}$). As used herein, the term WOTS shall refer to the WOTS signature scheme and or a derivative scheme such as WOTS+.

The Leighton/Micali signature (LMS) scheme is another hash-based signature scheme that uses Leighton/Micali one-time signatures (LM-OTS) as the one-time signature building block. LMS signatures are based on a SHA2-256 hash function.

An XMSS signature process comprises three major operations. The first major operation receives an input message (M) and a private key (sk) and utilizes a one-time signature algorithm (e.g., WOTS+) to generate a message representative (M') that encodes a public key (pk). In a 128-bit post quantum security implementation the input message M is subjected to a hash function and then divided into 67 message components (n bytes each), each of which are subjected to a hash chain function to generate the a corresponding 67 components of the digital signature. Each chain function invokes a series of underlying secure hash algorithms (SHA).

The second major operation is an L-Tree computation, which combines WOTS+(or WOTS) public key components (n-bytes each) and produces a single n-byte value. For example, in the 128-bit post-quantum security there are 67 public key components, each of which invokes an underlying secure hash algorithm (SHA) that is performed on an input block.

The third major operation is a tree-hash operation, which constructs a Merkle tree. In an XMSS verification, an authentication path that is provided as part of the signature and the output of L-tree operation is processed by a tree-hash operation to generate the root node of the Merkle tree, which should correspond to the XMSS public key. For XMSS verification with 128-bit post-quantum security, traversing the Merkle tree comprises executing secure hash operations. In an XMSS verification, the output of the Tree-hash operation is compared with the known public key. If they match then the signature is accepted. By contrast, if they do not match then the signature is rejected.

An important limitation of all OTS algorithms, and many hash-based signature schemes built upon OTS techniques, is that use of any single private key more than once enables an attacker to forge signatures in the scheme. It is therefore imperative that systems which enable automated signing of code, as is common in Continuous Integration/Continuous Delivery (CI/CD) software development methodologies, single usage of an HBS signing key is guaranteed. Further, recovery from equipment failures or environmental conditions which may create a business continuity disruption, are handled in a way that maintains the guarantee of single-use for every private key. Design and construction of automated signing facilities must take into account both normal operations to ensure HBS signing keys are used only once, as well as exception or disaster conditions that could disrupt the normal flow or sequence of use of HBS private keys.

Post-Quantum Cryptography Overview

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Figure 1B:
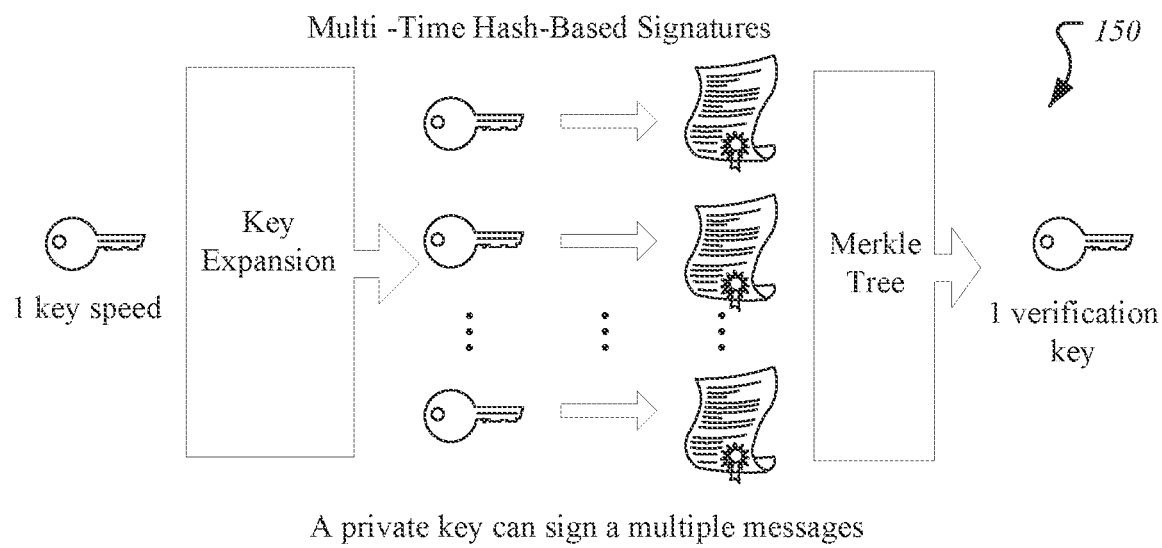

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Although any post-quantum cryptography could be built on the current cryptography, the novel approach would need to be intelligent, fast, and precise enough to resist and defeat any attacks by quantum computers FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), and SPHINCs scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessarily basic ingredients to counter the quantum counting and post-quantum computing challenges. HBS schemes are regarded as fast signature algorithms working with fast platform secured-boot, which is regarded as the most resistant to quantum and post-quantum computing attacks.

For example, as illustrated with respect to FIG. 1A, a scheme of HBS is shown that uses Merkle trees along with a one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
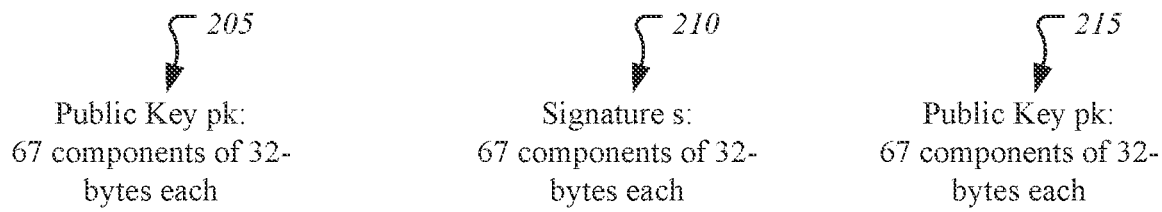
FIGS. 2A-2B are schematic illustrations of a one-time signature scheme and a multi-time signature scheme, respectively.
Figure 2A:
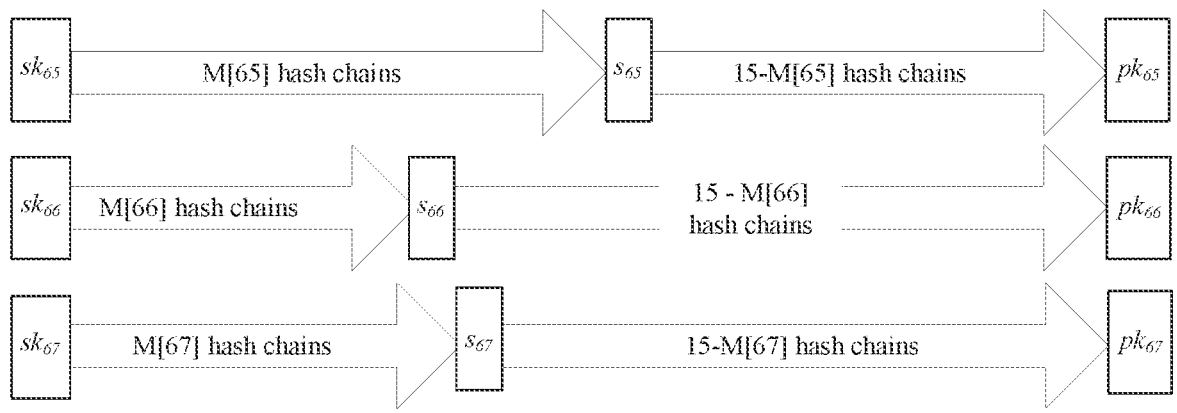
Figure 2B:
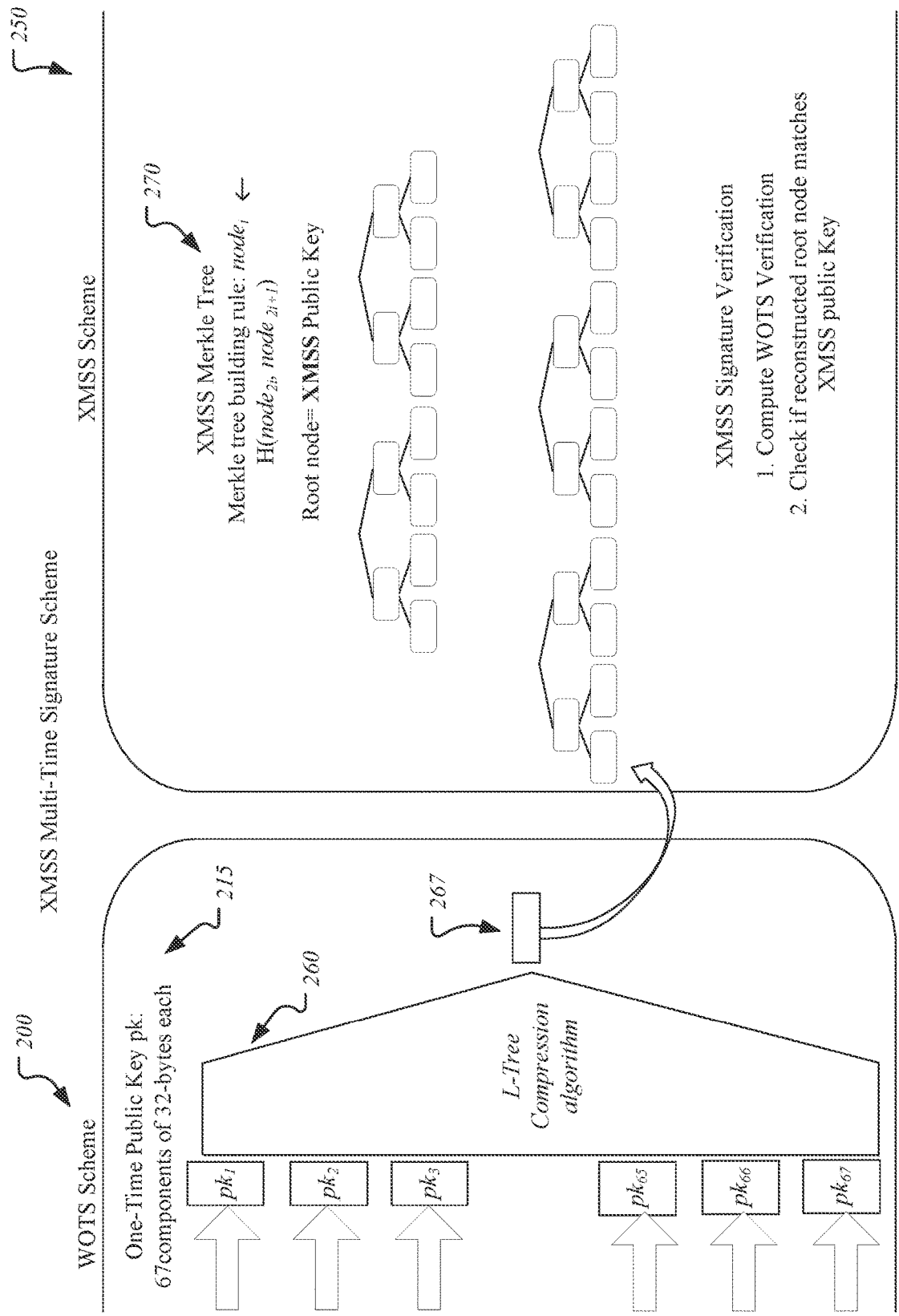

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS scheme 200, which was offered by Robert Winternitz of Stanford Mathematics Department publishing as hw(x) as opposed to h(x)Ih(y), while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

FIG. 2B illustrates XMSS MTS scheme 250 that allows for a combination of WOTS scheme 200 of FIG. 2A and XMSS scheme 255 having XMSS Merkle tree. As discussed previously with respect to FIG. 2A, WOTs scheme 200 is based on a one-time public key, pk, 215, having 67 components of 32 bytes each, that is then put through L-Tree compression algorithm 260 to offer WOTS compressed pk 265 to take a place in the XMSS Merkle tree of XMSS scheme 255. It is contemplated that XMSS signature verification may include computing WOTS verification and checking to determine whether a reconstructed root node matches the XMSS public key, such as root node=XMSS public key.

Post-Quantum Cryptography

Figure 3:
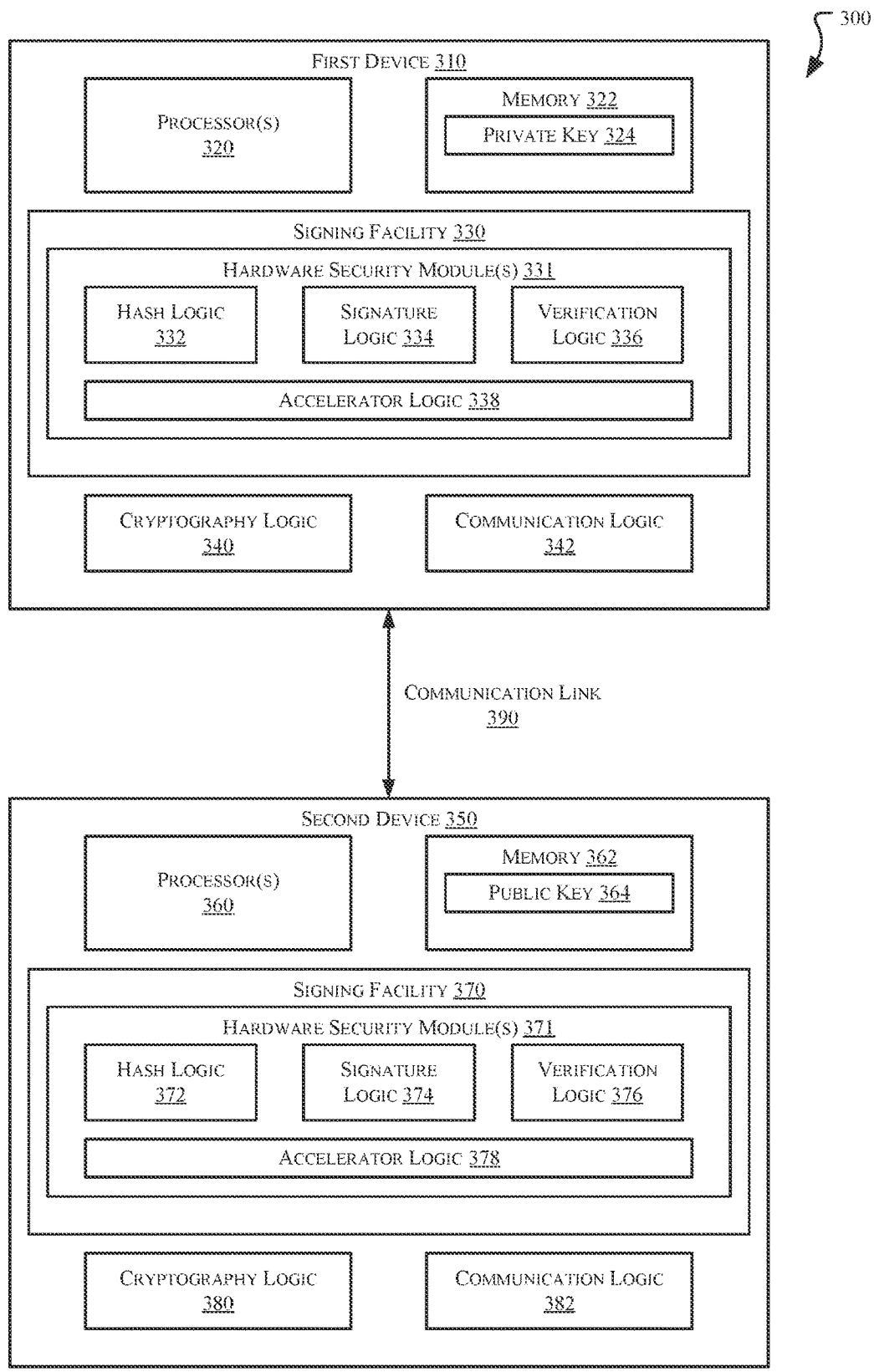
FIG. 3 is a schematic illustration of a signing device and a verifying device, in accordance with some examples.

FIG. 3 is a schematic illustration of a high-level architecture of a secure environment 300 that includes a first device 310 and a second device 350, in accordance with some examples. Referring to FIG. 3, each of the first device 310 and the second device 350 may be embodied as any type of computing device capable of performing the functions described herein. For example, in some embodiments, each of the first device 310 and the second device 350 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 310 includes one or more processor(s) 320 and a memory 322 to store a private key 324. The processor(s) 320 may be embodied as any type of processor capable of performing the functions described herein. For example, the processor(s) 320 may be embodied as a single or multi-core processor(s), digital signal processor, microcontroller, or other processor or processing/controlling circuit. Similarly, the memory 322 may be embodied as any type of volatile or non-volatile memory or data storage capable of performing the functions described herein. In operation, the memory 322 may store various data and software used during operation of the first device 310 such as operating systems, applications, programs, libraries, and drivers. The memory 322 is communicatively coupled to the processor(s) 320. In some examples the private key 324 may reside in a secure memory that may be part memory 322 or may be separate from memory 322.

First device 310 further comprises a signing facility 330 which comprises one or more hardware security module(s) 331 which includes memory 332, signature logic, and verification logic 336. Hash logic 332 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 332 may be configured to generate a signature to be transmitted, i.e., a transmitted signature and/or to verify a signature. In instances in which the first device 310 is the signing device, the transmitted signature may include a number, L, of transmitted signature elements with each transmitted signature element corresponding to a respective message element. For example, for each message element, $m_i$, signature logic 332 may be configured to perform a selected signature operation on each private key element, $s_{ki}$ of the private key, $s_k$, a respective number of times related to a value of each message element, $m_i$ included in the message representative m'. For example, signature logic 332 may be configured to apply a selected hash function to a corresponding private key element, $s_{ki}$, $m_i$ times. In another example, signature logic 332 may be configured to apply a selected chain function (that contains a hash function) to a corresponding private key element, $s_{ki}$, $m_i$ times. The selected signature operations may, thus, correspond to a selected hash-based signature scheme.

Hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) informational draft Internet notes, e.g., draft draft-irtf-cfrg-xmss-hash-based-signatures-00, titled "XMSS: Extended Hash-Based Signatures, released April 2015, by the Internet Research Task Force, Crypto Forum Research Group of the IETF® and/or later and/or related versions of this informational draft, such as draft draft-irtf-cfrg-xmss-hash-based-signatures-06, released June 2016.

Winternitz OTS is configured to generate a signature and to verify a received signature utilizing a hash function. Winternitz OTS is further configured to use the private key and, thus, each private key element, $s_{ki}$, one time. For example, Winternitz OTS may be configured to apply a hash function to each private key element, $m_i$ or N-$m_i$ times to generate a signature and to apply the hash function to each received message element N-$m_i'$ or $m_i'$ times to generate a corresponding verification signature element. The Merkle many time signature scheme is a hash-based signature scheme that utilizes an OTS and may use a public key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. The number of calls to the hash function included in the chain function may be fixed. Chain functions may improve security of an associated hash-based signature scheme. Hash-based signature balancing, as described herein, may similarly balance chain function operations.

Cryptography logic 340 is configured to perform various cryptographic and/or security functions on behalf of the signing device 310. In some embodiments, the cryptography logic 340 may be embodied as a cryptographic engine, an independent security co-processor of the signing device 310, a cryptographic accelerator incorporated into the processor(s) 320, or a standalone software/firmware. In some embodiments, the cryptography logic 340 may generate and/or utilize various cryptographic keys (e.g., symmetric/asymmetric cryptographic keys) to facilitate encryption, decryption, signing, and/or signature verification. Additionally, in some embodiments, the cryptography logic 340 may facilitate to establish a secure connection with remote devices over communication link. It should further be appreciated that, in some embodiments, the cryptography module 340 and/or another module of the first device 310 may establish a trusted execution environment or secure enclave within which a portion of the data described herein may be stored and/or a number of the functions described herein may be performed.

After the signature is generated as described above, the message, M, and signature may then be sent by first device 310, e.g., via communication logic 342, to second device 350 via network communication link 390. In an embodiment, the message, M, may not be encrypted prior to transmission. In another embodiment, the message, M, may be encrypted prior to transmission. For example, the message, M, may be encrypted by cryptography logic 340 to produce an encrypted message.

Second device 350 may also include one or more processors 360 and a memory 362 to store a public key 364. As described above, the processor(s) 360 may be embodied as any type of processor capable of performing the functions described herein. For example, the processor(s) 360 may be embodied as a single or multi-core processor(s), digital signal processor, microcontroller, or other processor or processing/controlling circuit. Similarly, the memory 362 may be embodied as any type of volatile or non-volatile memory or data storage capable of performing the functions described herein. In operation, the memory 362 may store various data and software used during operation of the second device 350 such as operating systems, applications, programs, libraries, and drivers. The memory 362 is communicatively coupled to the processor(s) 360.

In some examples the public key 364 may be provided to verifier device 350 in a previous exchange. The public key, $p_k$, is configured to contain a number L of public key elements, i.e., $p_k=[p_{k1}, \ldots, p_{kL}]$. The public key 364 may be stored, for example, to memory 362.

Second device 350 further comprises a signing facility 370 comprising one or more hardware security module 371 which includes hash logic 372, signature logic, and verification logic 376. As described above, hash logic 372 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

In instances in which the second device is the verifying device, hardware security module 371 is configured to generate a verification signature based, at least in part, on the signature received from the first device and based, at least in part, on the received message representative (m'). For example, hardware security module 371 may configured to perform the same signature operations, i.e., apply the same hash function or chain function as applied by hash logic 332 of hardware security module 331, to each received message element a number, N-$m_{i'}$ (or $m_{i'}$), times to yield a verification message element. Whether a verification signature, i.e., each of the L verification message elements, corresponds to a corresponding public key element, $p_{ki}$, may then be determined. For example, verification logic 376 may be configured to compare each verification message element to the corresponding public key element, $p_{ki}$. If each of the verification message element matches the corresponding public key element, $p_{ki}$, then the verification corresponds to success. In other words, if all of the verification message elements match the public key elements, $p_{k1}, \ldots, p_{kL}$, then the verification corresponds to success. If any verification message element does not match the corresponding public key element, $p_{ki}$, then the verification corresponds to failure.

As described in greater detail below, in some examples the hardware security module 331 of the first device 310 includes one or more accelerators 338 that cooperate with the hash logic 332, signature logic 334 and/or verification logic 336 to accelerate authentication operations. Similarly, in some examples the hardware security module 371 of the second device 310 includes one or more accelerators 378 that cooperate with the hash logic 372, signature logic 374 and/or verification logic 376 to accelerate authentication operations. Examples of accelerators are described in the following paragraphs and with reference to the accompanying drawings.

The various modules of the environment 300 may be embodied as hardware, software, firmware, or a combination thereof. For example, the various modules, logic, and other components of the environment 300 may form a portion of, or otherwise be established by, the processor(s) 320 of first device 310 or processor(s) 360 of second device 350, or other hardware components of the devices As such, in some embodiments, one or more of the modules of the environment 300 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

Figure 4A:
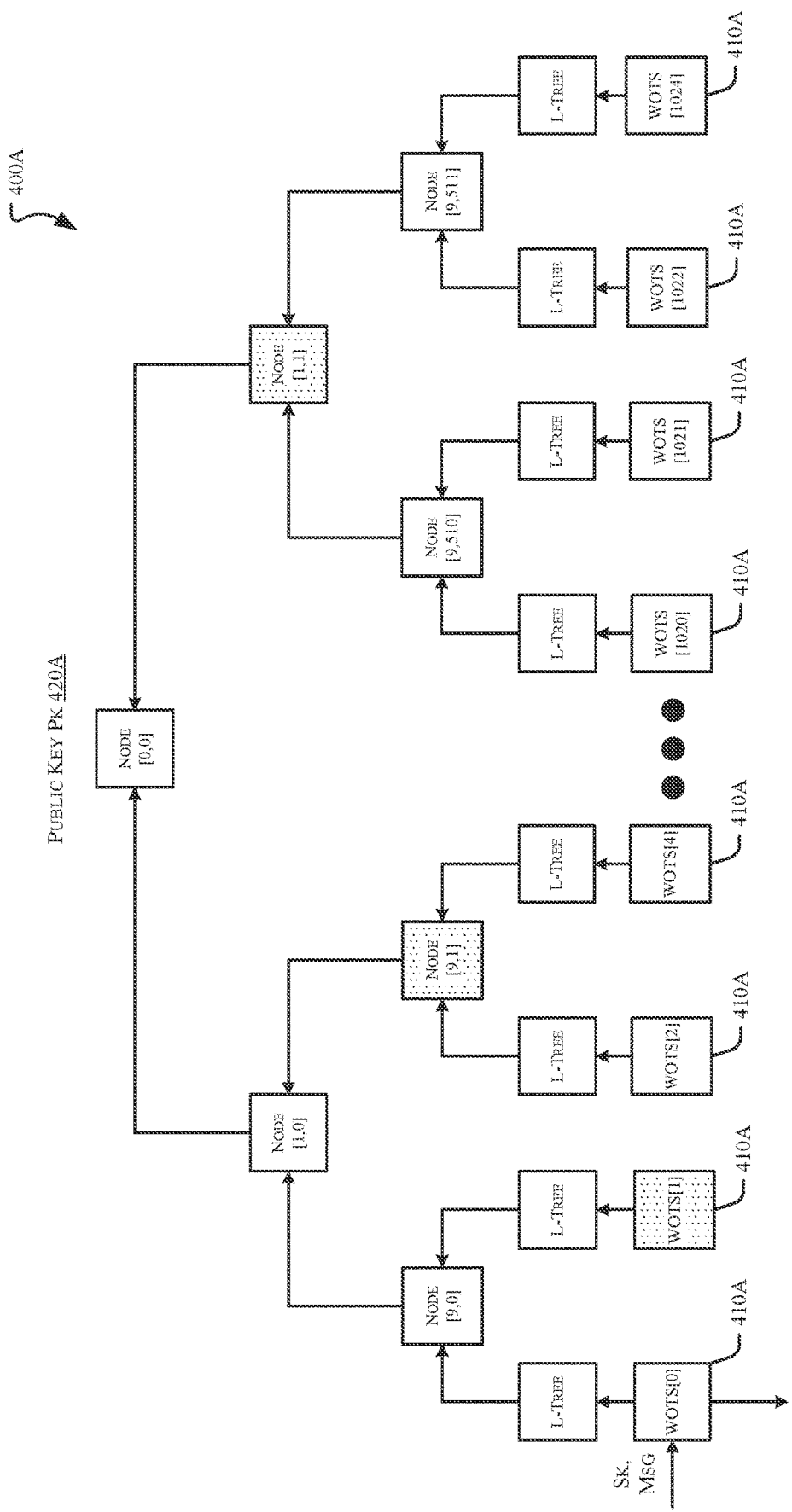
FIG. 4A is a schematic illustration of a Merkle tree structure, in accordance with some examples.

FIG. 4A is a schematic illustration of a Merkle tree structure illustrating signing operations, in accordance with some examples. Referring to FIG. 4A, an XMSS signing operation requires the construction of a Merkle tree 400A using the local public key from each leaf WOTS node 410 to generate a global public key (PK) 420. In some examples the authentication path and the root node value can be computed off-line such that these operations do not limit performance. Each WOTS node 410 has a unique secret key, "sk" which is used to sign a message only once. The XMSS signature consists of a signature generated for the input message and an authentication path of intermediate tree nodes to construct the root of the Merkle tree.

Figure 4B:
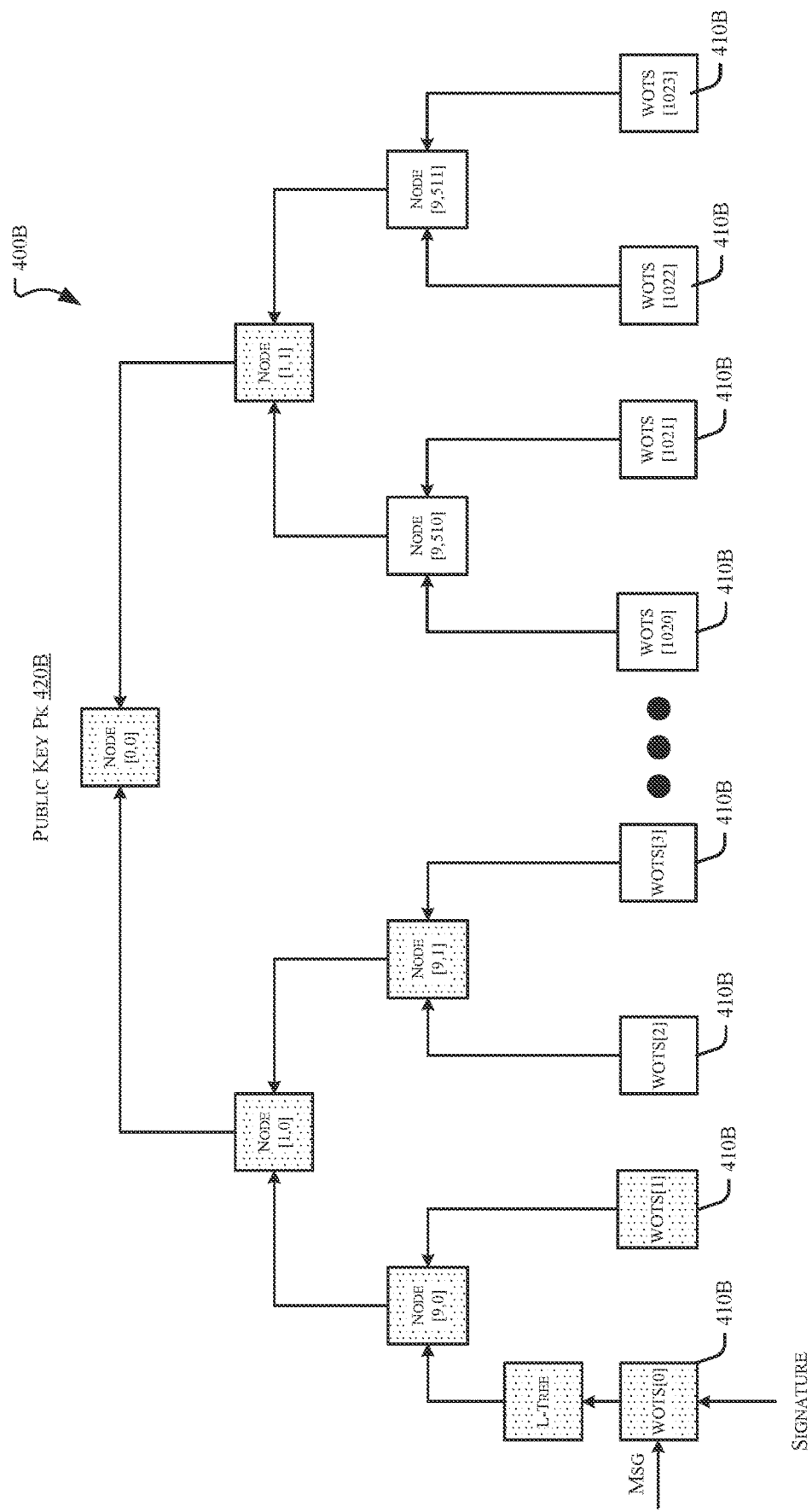
FIG. 4B is a schematic illustration of a Merkle tree structure, in accordance with some examples.

FIG. 4B is a schematic illustration of a Merkle tree structure 400B during verification, in accordance with some examples. During verification, the input message and signature are used to compute the local public key 420B of the WOTS node, which is further used to compute the tree root value using the authentication path. A successful verification will match the computed tree root value to the public key PK shared by the signing entity. The WOTS and L-Tree operations constitute on average 82% and 16% of XMSS sign/verify latency respectively, thus defining the overall performance of the authentication system. Described herein are various pre-computation techniques which may be implemented to speed-up WOTS and L-Tree operations, thereby improving XMSS performance. The techniques are applicable to the other hash options and scale well for both software and hardware implementations.

Figure 5:
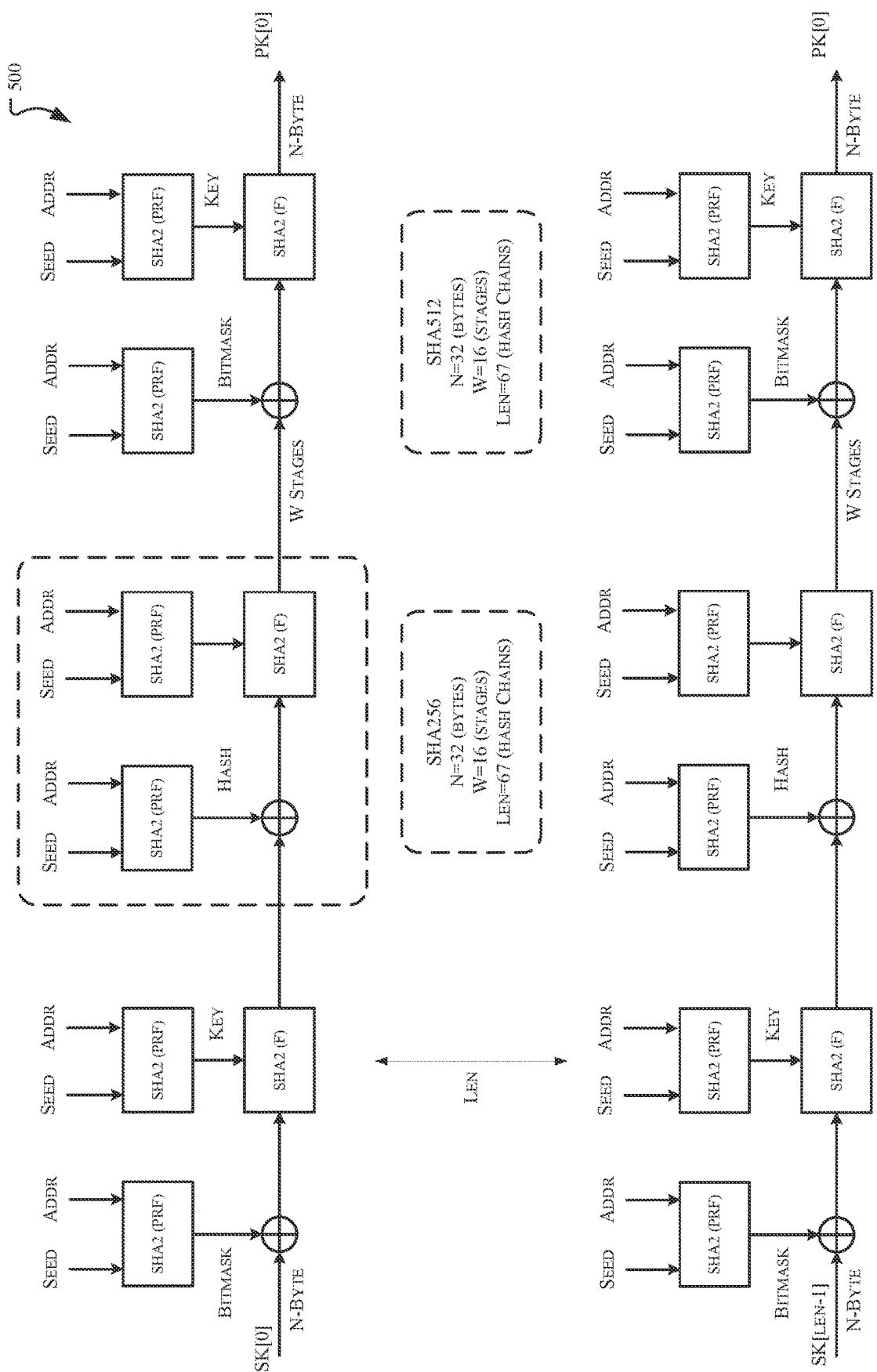
FIG. 5 is a schematic illustration of a compute blocks in an architecture to implement a signature algorithm, in accordance with some examples.

FIG. 5 is a schematic illustration of a compute blocks in an architecture 500 to implement a signature algorithm, in accordance with some examples. Referring to FIG. 5, the WOTS+ operation involves 67 parallel chains of 16 SHA2-256 HASH functions, each with the secret key sk[66:0] as input. Each HASH operation in the chain consists of 2 pseudo-random functions (PRF) using SHA2-256 to generate a bitmask and a key. The bitmask is XOR-ed with the previous hash and concatenated with the key as input message to a 3rd SHA2-256 hash operation. The 67x32-byte WOTS public key pk[66:0] is generated by hashing secret key sk across the 67 hash chains.

Figure 6A:
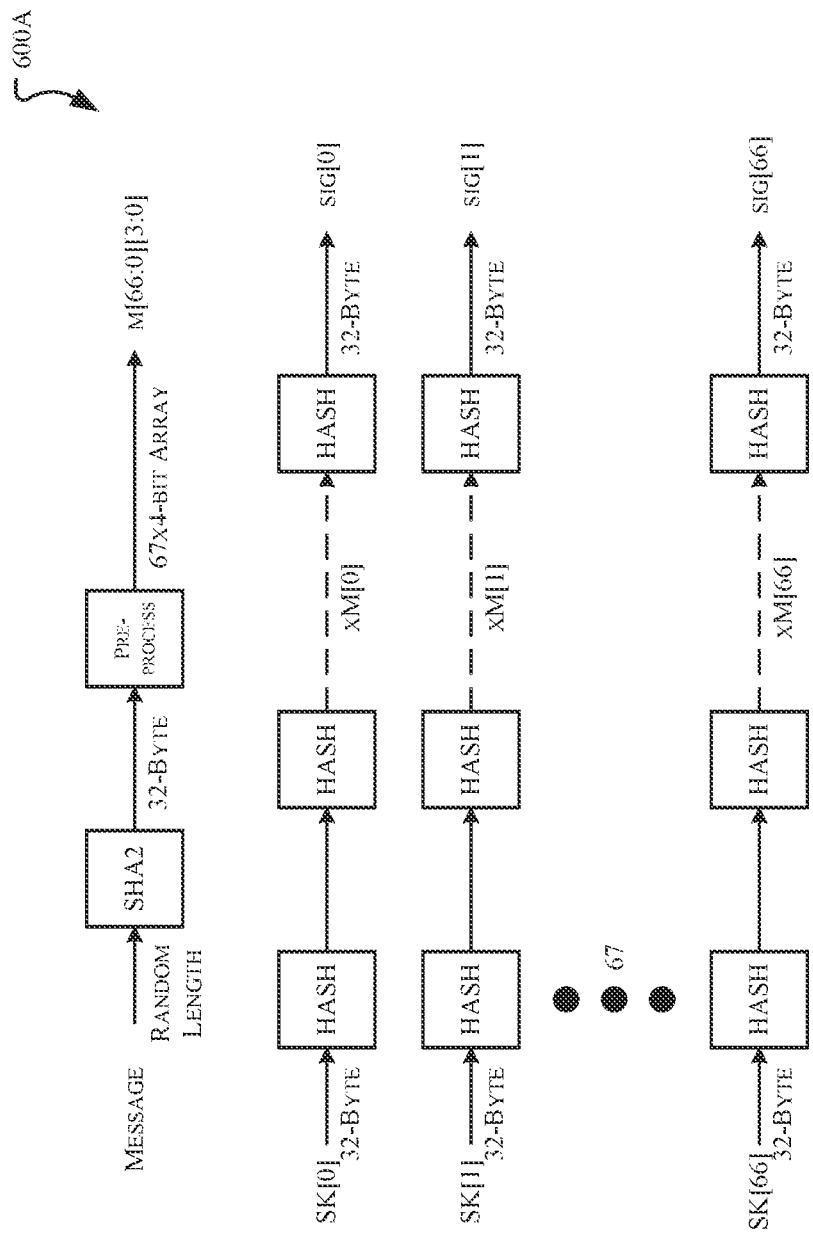
FIG. 6A is a schematic illustration of a compute blocks in an architecture to implement signature generation in a signature algorithm, in accordance with some examples.

FIG. 6A is a schematic illustration of a compute blocks in an architecture 600A to implement signature generation in a signature algorithm, in accordance with some examples. As illustrated in FIG. 6A, for message signing, the input message is hashed and pre-processed to compute a 67x4-bit value, which is used as an index to choose an intermediate hash value in each chain.

Figure 6B:
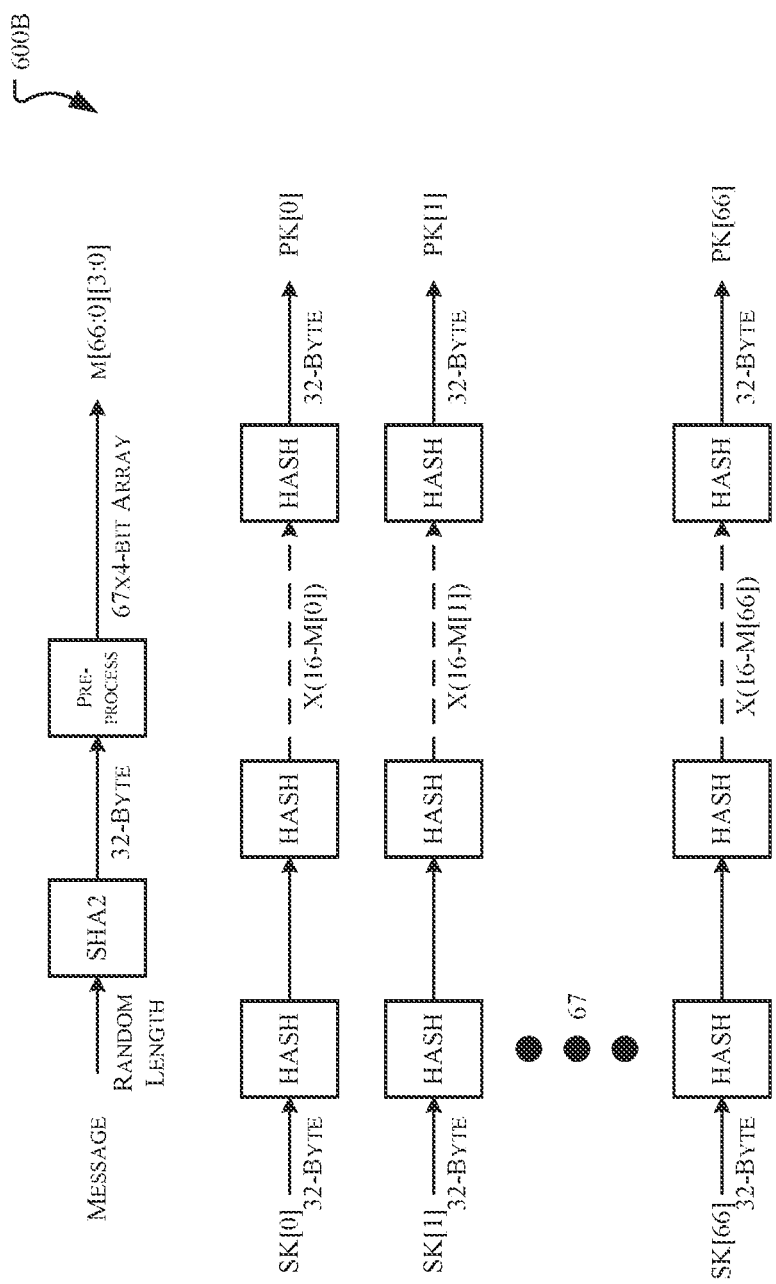
FIG. 6B is a schematic illustration of a compute blocks in an architecture to implement signature verification in a verification algorithm, in accordance with some examples.

FIG. 6B is a schematic illustration of a compute blocks in an architecture 600B to implement signature verification in a verification algorithm, in accordance with some examples. Referring to FIG. 6B, during verification, the message is again hashed to compute the signature indices and compute the remaining HASH operations in each chain to compute the WOTS public key pk. This value and the authentication path are used to compute the root of the Merkle tree and compare with the shared public key PK to verify the message.

Robust State Synchronization for Stateful Hash-Based Signatures

Hash-Based Signature (HBS) schemes such as the XMSS schemes described above are stateful, which means that some state (e.g., a monotonic counter) needs to be securely stored in between signature generations. If a signer reuses the same counter (which means reusing the same one-time signing key), this exposes the system to forgeability attacks. Some digital signature signing facilities utilize multiple Hardware Security Modules (HSM) to improve availability of the signing system. If HBS schemes are integrated into these signing facilities, these signing facilities need to offer a mechanism to securely synchronize the state (e.g., a monotonic counter) across all HSM signers available in the facility.

Additionally, because HBS schemes in some renditions have a limited number of total signing operations based on the size of the tree, an attack on the signing system or an error in the signing system could cause a "wear-out" of the signing key where all possible counters are used up and the signing key cannot be used anymore. In systems where the life of a product is tied to the life of the HBS signing key, this can result in a denial of service of the product. Signing facilities must ensure such accidental and malicious wear-out of signing keys are prevented or their impacts are minimized.

Figure 7:
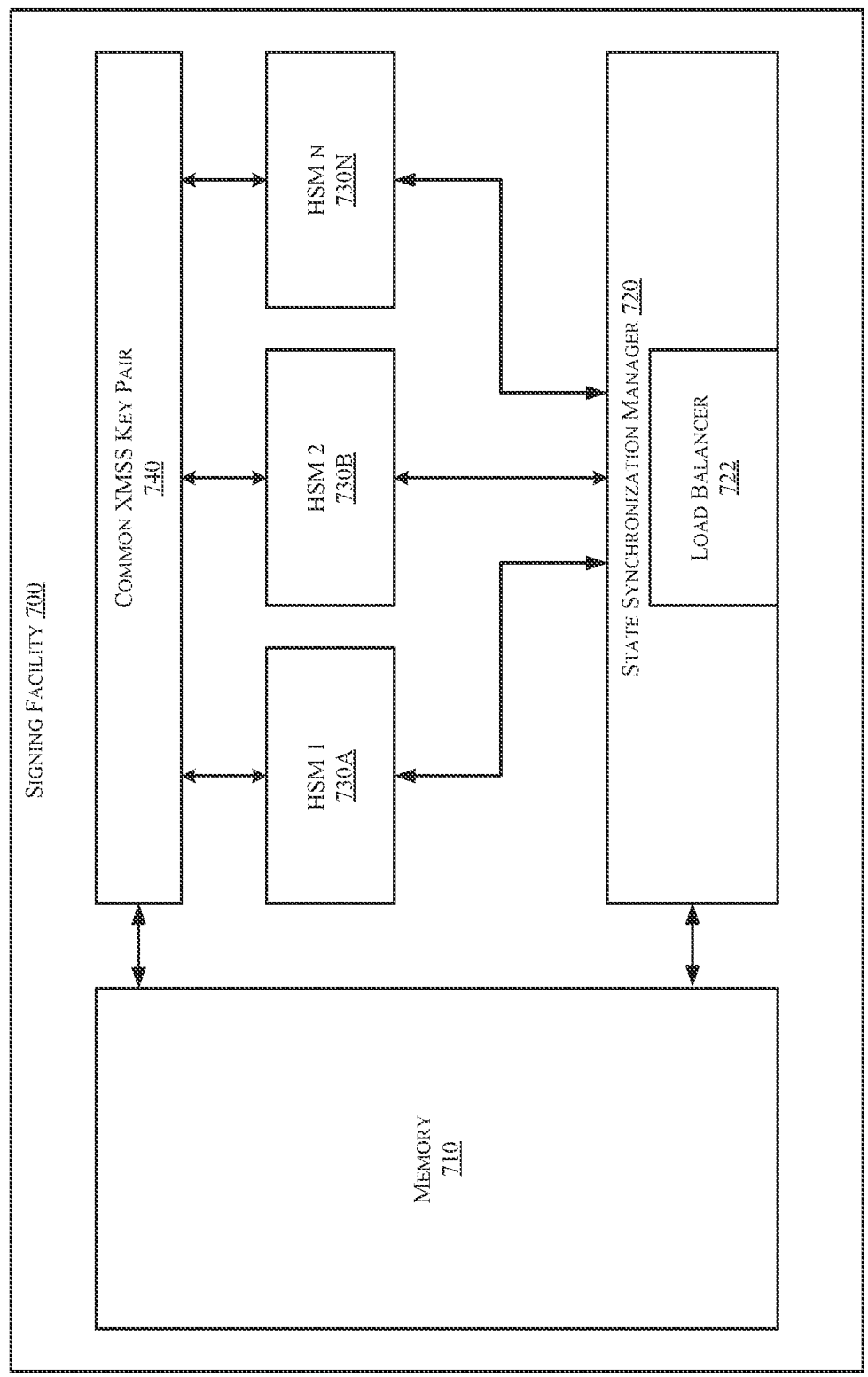
FIG. 7 is a schematic illustration of compute blocks in an architecture to implement robust state synchronization for stateful hash-based signatures, in accordance with some examples.

FIG. 7 is a schematic illustration of compute blocks in an architecture to implement robust state synchronization for stateful hash-based signatures, in accordance with some examples. Referring to FIG. 7, in some examples signing facility 700 may comprise a computer readable memory block (or register file) 710 which may be used to store signature operation inputs and intermediate results for the signature operations, a state synchronization manager 720, a load balancer 722, a plurality of hardware security modules 730A, 730B, . . . 730N, (collectively referred to herein by reference numeral 730) which are configured to compute signatures using a common XMSS key pair 740.

For example, in the simplest cases, each HSM in the signing facility 700 can sign for a single unique key. This ensures no key is used twice, but does not address scaling the signing facility to sign many things with the same key, for example a software design house that must sign every piece of software.

Figure 8:
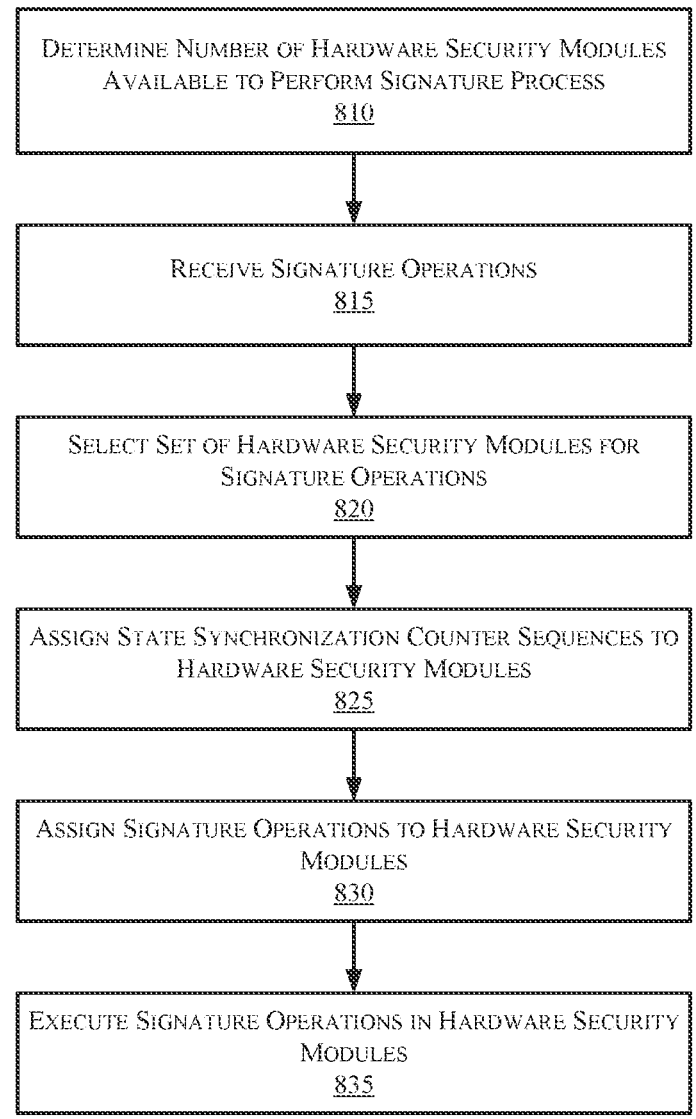
FIG. 8 is a flowchart illustrating operations in a method to implement robust state synchronization for stateful hash-based signatures, in accordance with some examples.

In some examples, operations may be implemented to ensure that each hardware security module used in calculating digital signatures for a Merkle tree uses a unique state synchronization counter sequence to prevent different hardware security modules from using the same counter. FIG. 8 is a flowchart illustrating operations in a method to implement robust state synchronization for stateful hash-based signatures, in accordance with some examples. In some examples the operations depicted in FIG. 8 may be implemented by processing circuitry in, or communicatively coupled to, a signing facility. In the example architecture depicted in FIG. 7, the operations of FIG. 8 may be implemented by processing circuitry in the state synchronization manger 720, alone or in combination with the hardware security modules 730.

Referring to FIG. 8, at operation 810, a number of hardware security modules 730 available to perform a digital signature process is determined. In some examples the state synchronization manager 720 may maintain a listing of the hardware security modules 730 in the signing facility that are operational and available to perform a digital signature process. At operation 815 one or more signature operations are received in the signing facility. In some examples the signature operations may comprise calculating all or part of a hash-based signature as a component of a Merkle tree, as described above.

At operation 820 a set of hardware security modules 730 is selected to perform the digital signature operations received in operation 815. In some examples the state synchronization manager 720 may selected a subset comprising two or more hardware security modules 730 from the plurality of hardware security modules that are operational and available to execute digital signature operations. Further, in some examples the load balancer 722 may monitor the workload of the different hardware security modules 730 to facilitate selecting a subset of the hardware security modules such that the computing load is distributed between the available hardware security modules 730 in a fashion that smooths the work load assigned to the hardware security modules 730.

At operation 825 state synchronization counter sequences are assigned to the hardware security modules 730 in the set of hardware security modules selected in operation 820. In some examples the state synchronization counter sequences are assigned such that each hardware security module 730 in the set of hardware security modules selected in operation 820 operates with a unique state synchronization counter sequence. As a general principle, this may be accomplished by assigning the sequences such that the modulo operation (a mod n), where a is the counter and n is the total number of hardware security modules 730 in the set, is unique for each hardware security module 730 in the set of hardware security modules 730 selected in operation 820.

For example, if a set of two hardware security modules (e.g., 730A, 730B) are selected in operation 820, then hardware security module 730A may be assigned a state synchronization counter sequence comprising only even integers (e.g., 0, 2, 4, 6, 8, 10, . . . ) and the hardware security module 730B may be assigned a state synchronization counter sequence comprising only odd integers (e.g., 1, 3, 5, 7, 9, 11, . . . ). By extension, if a set of three hardware security modules (e.g., 730A, 730B, 730N) are selected in operation 820, then hardware security module 730A may be assigned a state synchronization counter sequence comprising only integers that are evenly divisible by 3, i.e., for which a mod 3 evaluates to zero, (e.g., 0, 3, 6, 9, 12, . . . ), the hardware security module 730B may be assigned a state synchronization counter sequence comprising only integers that are divisible by 3 with a remainder of 1 i.e., for which a mod 3 evaluates to one, (e.g., 1, 4, 7, 10, 13, . . . ), and the hardware security module 730N may be assigned a state synchronization counter sequence comprising only integers that are divisible by 3 with a remainder of 2, i.e., for which a mod 3 evaluates to 2, (e.g., 2, 5, 8, 11, 14, . . . ). This procedure can be scaled up to accommodate any number of hardware security modules 730.

One potential drawback to this approach is that selection of HSMs may not be uniform resulting in one HSM running out of counters before the other HSMs, and then not being able to perform additional signatures. In this case, the HSM 730 must be able to communicate with the manager 720 to report this condition, to allow the manger to select a different HSM to complete the signing operation.

Another potential problem with this approach is disaster recovery. If an HSM breaks, it may not be possible to determine the last counter value that was used. This requires the counter to be incremented to a larger value than the HSM could have reasonably consumed, and results in wasting many viable signing keys. For example, an HSM fails and the counter was last known to be 100, but it is unclear how many signings took place. If 10 signings could be done a second, and there were 15 minutes of down-time not allocated in logs, the counter must be incremented to 100+ (10*60*15)=9100 resulting in possibly 9000 lost signing keys.

A third approach is using shared duplicate state. The state synchronization manager 722 retains a database of encrypted state in the memory 710. Only the HSMs can decrypt the state. When a signing operation is requested, the load balancer 722 selects an available HSM 730 and the state synchronization manager 720 retrieves the encrypted state from memory 710 based on the requested signing key and sends the encrypted state to the selected HSM.

The HSM decrypts the state which includes the next available counter, signs the message, updates the counter and other state information, re-encrypts the state information and sends the signed message and updated and re-encrypted state back to the state synchronization manager 720. The manager 720 updates the state in the database in memory 710 and returns the signed message to the requestor. If another request to sign with the same key arrives at the manager 720 while an HSM has the state checked out, the manager 720 queues the request and waits for the signing key's state to be returned and updated in the database.

Disaster recovery may be performed and only lose a single key. The synchronization manager 720, recognizes an HSM (example e.g., 730B) is down and removes that HSM from the signing operations by telling the load balancer 722 to deschedule the HSM 730B. The synchronization manager 720 sends the encrypted state from the database in memory 710 to a working HSM 730C and commands the working HSM 730C to increment the state by one to recover from a lost signing operation. The commanded HSM 730C decrypts the state, increments the counter, re-encrypts the state and returns the re-encrypted state to the synchronization manager 720. The synchronization manager 720 updates the new state in the database in memory 710, and resubmits the lost signing request with the updated state to an available HSM. In this failure case only a single signing key is lost.

In other renditions, all HSMs 730 have a copy of a database for all keys in the NVM memory. All HSMs 730 can communicate to the synchronization manager 720 (as well as to each other). For example, HSM 730A can send messages and receive messages from HSM 730B and 730C. The synchronization manager 720 sends a signing request to an HSM (example e.g., HSM 730A) for a specific signing key (e.g., signing key #23) to perform signing. In response, the synchronization manager 720 marks HSM 730A as having a lock on signing key #23. HSM 730A sends a message to all other HSMs in the facility that it is going to be signing with signing key #23, and waits until all HSMs acknowledge this action. Each other HSM, when receiving the message from HSM 730A, marks singing key #23 as locked by HSM 730A, and sends a message to HSM 730A that they acknowledge and accept the lock request.

When HSM 730A receives a lock acknowledge from all other HSMs, it performs the signing operation, increments the counter for signing key #23 in its internal state, and sends an unlock request to all HSMs with an updated counter value, and waits for all HSMs to respond. When each HSM receives the unlock request for signing key #23 with a new counter value, the HSMs update their respective counter values state for signing key #23, unlock the signing key #23, and send an acknowledge message to HSM 730A that the key #23 state is updated.

When HSM 730A gets an unlock acknowledge message from all HSMs, it unlocks its state for key #23, sends a message to manager 720 that the operation is complete and signing key #23 is unlocked, and returns the result of the sign operation (e.g., the signed message0 to the synchronization manager 720). The synchronization manager 720 marks signing key #23 as free.

If any HSM does not respond to the signing HSM 730A in a reasonable amount of time set by the timeout window configuration, the HSM 730A reports the unresponsive HSM to the synchronization manger 720. In response, the manager 720 takes any nonresponsive HSM offline and reports the unresponsive HSM to all HSMs, thereby taking the nonresponsive HSM out of the communication loop. No signing keys are lost in this case. If a signing HSM 730A fails during operation and never responds to the manger 720 after a timeout period, the manager 720 takes HSM 730A out of operation and informs all other HSMS that HSM 730A is no longer operating and to increment the state of the signing key #23. In this case a single signing key is lost.

In another rendition an attack on the signing system allows an attacker to replay valid signing requests to the signing system, forcing the signing system to perform many signings on the same key, and wearing out the HBS key causing the key to no longer be usable because all possible counter values have been consumed. In this rendition of the signing system, applicable to all previous renditions of counter-based signing systems, a requestor submits it's signing request with a maximum counter value. An HSM in the system will only sign with the requested key if the counter is no larger than the specified counter.

In this example, the requestor queries the synchronization manager 720 to determine the current counter value of the counter for a specific key, e.g., key #23. In response, the synchronization manager 720 queries any HSM 730 for the counter value of key #23, or it retrieves the state from the memory 710 and asks any HSM to decrypt the state and report the counter value. Alternatively, the synchronization manager 720 has knowledge of the counter value itself. The synchronization manager 720 returns the counter to the requestor.

The requestor creates a signing request and sets the maximum counter value in the request to the counter value returned by the synchronization manager 720 plus some fixed value (which may be referred to as the window size), for example 5 or 10. The window size may be chosen based on the number of expected signing requests that could be performed by the signing facility for this key over a period of time the request is being constructed. For a key that has very few requests, this window size value may be low for instance 1 or 2; for keys that are in heavy use in automated build system this window size value may be larger. The requestor formulates the signing request to include the maximum counter value and digitally signs the request using a symmetric key or a public key known to the signing facility 700.

When the signing request is received by the signing facility 700, the synchronization manager 720 (or alternatively the HSMs in some renditions) verify the signature on the signing request, and verify the maximum counter value is not larger than the current counter for the signing key. If no violation occurs, the signing request is performed as outlined in the previous paragraphs updating the counter as defined for the different renditions described above. By contrast, if the current counter exceeds the value of the maximum counter in the request, then the request is rejected. In this system, if an attacker replays valid signing requests, the maximum number of wasted signing operations on the signing key can be no more than the window size.

At operation 830 digital signature operations are assigned to the hardware security modules selected in operation 825, and at operation 830 the signature operations are executed in the selected hardware security modules. In some examples the hardware security modules 730 may generate a digital signature by applying a hash function to a string comprising at least one of a private key and a counter in the state synchronization counter sequence assigned to the hardware security module 730. Assigning the state synchronization counter sequences using the techniques describe herein ensures that the same counter cannot be reused by different hardware security modules, thereby preventing forgeability attacks.

Figure 9:
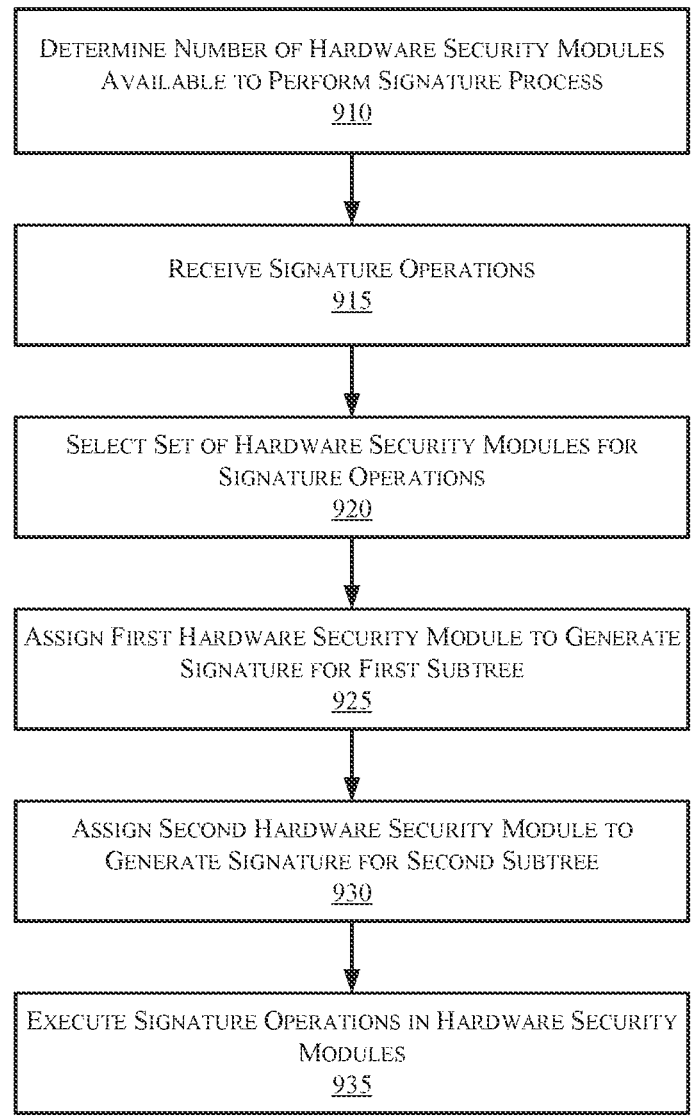
FIG. 9 is a flowchart illustrating operations in a method to implement robust state synchronization for stateful hash-based signatures, in accordance with some examples.

In another example, each hardware security module 730 in the signing facility may be assigned to a different subtree of a Merkle tree to prevent different hardware security modules from using the same counter. Referring to FIG. 9, at operation 910, a number of hardware security modules 730 available to perform a digital signature process is determined. In some examples the state synchronization manager 720 may maintain a listing of the hardware security modules 730 in the signing facility that are operational and available to perform a digital signature process. At operation 915 one or more signature operations are received in the signing facility. In some examples the signature operations may comprise calculating all or part of an XMSS hash-based signature as a component of a Merkle tree, as described above.

At operation 920 a set of hardware security modules 730 is selected to perform the digital signature operations received in operation 915. In some examples, the state synchronization manager 720 may selected a subset comprising two or more hardware security modules 730 from the plurality of hardware security modules that are operational and available to execute digital signature operations. Further, in some examples the load balancer 722 may monitor the workload of the different hardware security modules 730 to facilitate selecting a subset of the hardware security modules such that the computing load is distributed between the available hardware security modules 730 in a fashion that smooths the work load assigned to the hardware security modules 730.

One the hardware security modules 730 are selected they can be assigned to separate subtrees of a Merkle tree. Thus, in an example which utilizes two hardware security modules, at operation 925, a first hardware security module 730 selected in operation 920 is assigned to a first subtree and at operation 930 a second hardware security module 730 is assigned to a second subtree. This procedure can be scaled up to accommodate any number of hardware security modules 730.

At operation 935 the signature operations are executed in the selected hardware security modules. Assigning the hardware security modules to different subtrees ensures that the same counter cannot be reused by different hardware security modules, thereby preventing forgeability attacks.

Figure 10:
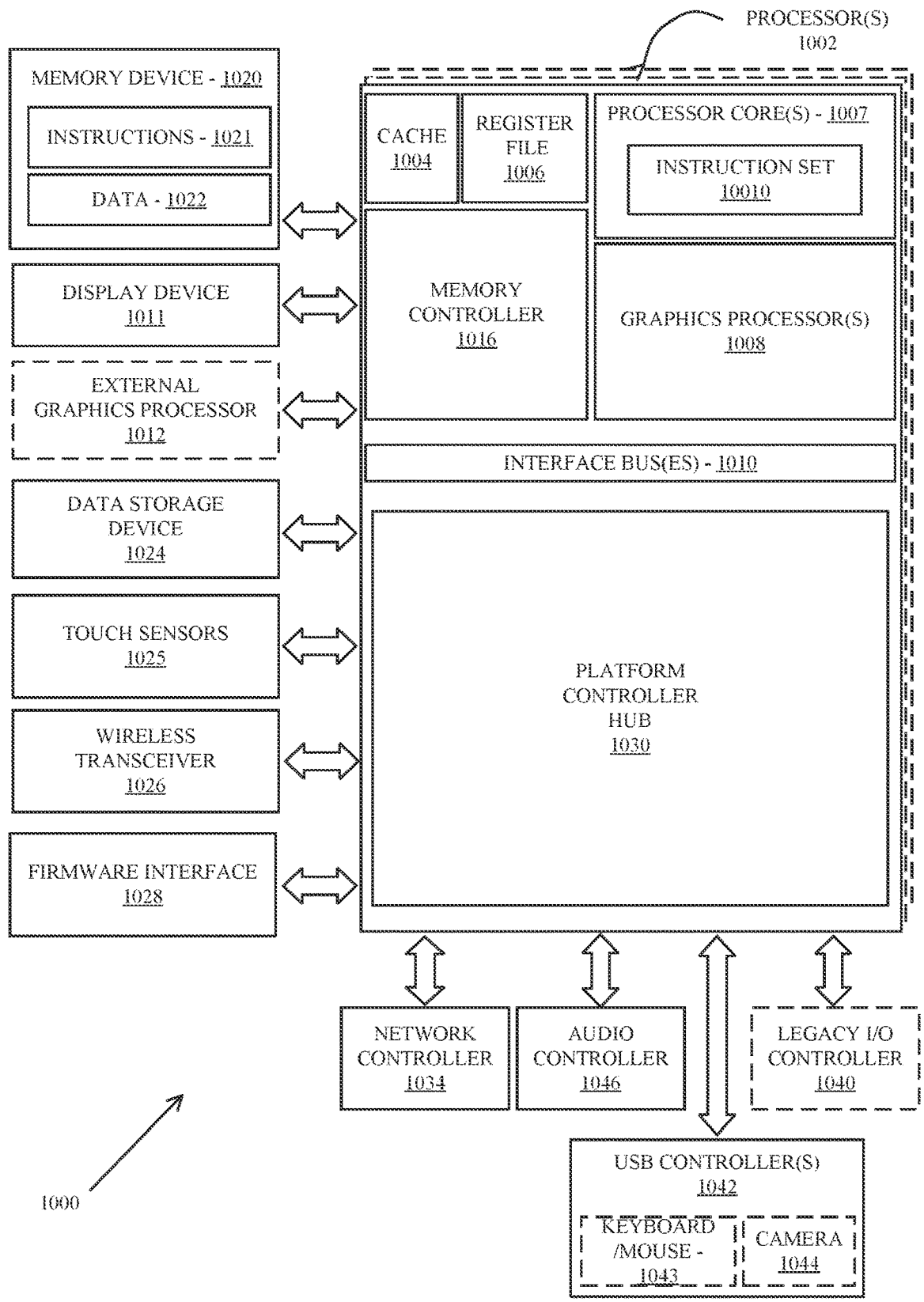
FIG. 10 is a schematic illustration of a computing architecture which may be adapted to implement hardware acceleration in accordance with some examples.

FIG. 10 illustrates an embodiment of an exemplary computing architecture that may be suitable for implementing various embodiments as previously described. In various embodiments, the computing architecture 1000 may comprise or be implemented as part of an electronic device. In some embodiments, the computing architecture 1000 may be representative, for example of a computer system that implements one or more components of the operating environments described above. In some embodiments, computing architecture 1000 may be representative of one or more portions or components of a digital signature signing system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 includes one or more processors 1002 and one or more graphics processors 1008, and may be a single processor desktop system, a multiprocessor workstation system, or a server system having a large number of processors 1002 or processor cores 1007. In on embodiment, the system 1000 is a processing platform incorporated within a system-on-a-chip (SoC or SOC) integrated circuit for use in mobile, handheld, or embedded devices.

An embodiment of system 1000 can include, or be incorporated within a server-based gaming platform, a game console, including a game and media console, a mobile gaming console, a handheld game console, or an online game console. In some embodiments system 1000 is a mobile phone, smart phone, tablet computing device or mobile Internet device. Data processing system 1000 can also include, couple with, or be integrated within a wearable device, such as a smart watch wearable device, smart eyewear device, augmented reality device, or virtual reality device. In some embodiments, data processing system 1000 is a television or set top box device having one or more processors 1002 and a graphical interface generated by one or more graphics processors 1008.

In some embodiments, the one or more processors 1002 each include one or more processor cores 1007 to process instructions which, when executed, perform operations for system and user software. In some embodiments, each of the one or more processor cores 1007 is configured to process a specific instruction set 1009. In some embodiments, instruction set 1009 may facilitate Complex Instruction Set Computing (CISC), Reduced Instruction Set Computing (RISC), or computing via a Very Long Instruction Word (VLIW). Multiple processor cores 1007 may each process a different instruction set 1009, which may include instructions to facilitate the emulation of other instruction sets. Processor core 1007 may also include other processing devices, such a Digital Signal Processor (DSP).

In some embodiments, the processor 1002 includes cache memory 1004. Depending on the architecture, the processor 1002 can have a single internal cache or multiple levels of internal cache. In some embodiments, the cache memory is shared among various components of the processor 1002. In some embodiments, the processor 1002 also uses an external cache (e.g., a Level-3 (L3) cache or Last Level Cache (LLC)) (not shown), which may be shared among processor cores 1007 using known cache coherency techniques. A register file 1006 is additionally included in processor 1002 which may include different types of registers for storing different types of data (e.g., integer registers, floating point registers, status registers, and an instruction pointer register). Some registers may be general-purpose registers, while other registers may be specific to the design of the processor 1002.

In some embodiments, one or more processor(s) 1002 are coupled with one or more interface bus(es) 1010 to transmit communication signals such as address, data, or control signals between processor 1002 and other components in the system. The interface bus 1010, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1002 include an integrated memory controller 1016 and a platform controller hub 1030. The memory controller 1016 facilitates communication between a memory device and other components of the system 1000, while the platform controller hub (PCH) 1030 provides connections to I/O devices via a local I/O bus.

Memory device 1020 can be a dynamic random-access memory (DRAM) device, a static random-access memory (SRAM) device, flash memory device, phase-change memory device, or some other memory device having suitable performance to serve as process memory. In one embodiment the memory device 1020 can operate as system memory for the system 1000, to store data 1022 and instructions 1021 for use when the one or more processors 1002 executes an application or process. Memory controller hub 1016 also couples with an optional external graphics processor 1012, which may communicate with the one or more graphics processors 1008 in processors 1002 to perform graphics and media operations. In some embodiments a display device 1011 can connect to the processor(s) 1002. The display device 1011 can be one or more of an internal display device, as in a mobile electronic device or a laptop device or an external display device attached via a display interface (e.g., DisplayPort, etc.). In one embodiment the display device 1011 can be a head mounted display (HMD) such as a stereoscopic display device for use in virtual reality (VR) applications or augmented reality (AR) applications.

In some embodiments the platform controller hub 1030 enables peripherals to connect to memory device 1020 and processor 1002 via a high-speed I/O bus. The I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). The data storage device 1024 can connect via a storage interface (e.g., SATA) or via a peripheral bus, such as a Peripheral Component Interconnect bus (e.g., PCI, PCI Express). The touch sensors 1025 can include touch screen sensors, pressure sensors, or fingerprint sensors. The wireless transceiver 1026 can be a Wi-Fi transceiver, a Bluetooth transceiver, or a mobile network transceiver such as a 3G, 4G, or Long Term Evolution (LTE) transceiver. The firmware interface 1028 enables communication with system firmware, and can be, for example, a unified extensible firmware interface (UEFI). The network controller 1034 can enable a network connection to a wired network. In some embodiments, a high-performance network controller (not shown) couples with the interface bus 1010. The audio controller 1046, in one embodiment, is a multi-channel high definition audio controller. In one embodiment the system 1000 includes an optional legacy I/O controller 1040 for coupling legacy (e.g., Personal System 2 (PS/2)) devices to the system. The platform controller hub 1030 can also connect to one or more Universal Serial Bus (USB) controllers 1042 connect input devices, such as keyboard and mouse 1043 combinations, a camera 1244, or other USB input devices.

The following pertains to further examples.

Example 1 is an apparatus, comprising a computer readable memory; a signing facility comprising a plurality of hardware security modules; and a state synchronization manager comprising processing circuitry to select, from the plurality of hardware security modules, a set of hardware security modules to be assigned to a digital signature process, the set of hardware security modules comprising at least a first hardware security module and a second hardware module; and assign a set of unique state synchronization counter sequences to the respective set of hardware security modules, the set of state synchronization counter sequences comprising at least a first state synchronization counter sequence and a second state synchronization counter sequence.

In Example 2, the subject matter of Example 1 can optionally include an arrangement wherein the first set of state synchronization counter sequences comprises a first plurality of counters selected from only even integers and is assigned to the first hardware security module; and the second set of state synchronization counter sequences comprises a second plurality of counters selected from only odd integers and is assigned to the second hardware security module.

In Example 3, the subject matter of any one of Examples 1-2 can optionally include signature processing circuitry to generate a first digital signature for a first message by applying a first hash function to a first string comprising at least one of a public key or a private key and a counter selected from the first plurality of counters.

In Example 4, the subject matter of any one of Examples 1-3 can optionally include signature processing circuitry to generate a second digital signature for a second message by applying a second hash function to a second string comprising at least one of a public key or a private key and a counter selected from the first plurality of counters.

In Example 5, the subject matter of any one of Examples 1-4 can optionally include a load balancer to select one of the first hardware security module or the second hardware security module to generate a signature.

In Example 6, the subject matter of any one of Examples 1-5 can optionally include processing circuitry to select a set of hardware security modules to be assigned to a digital signature process, the set of hardware security modules comprising at least a first hardware security module and a second hardware module and a third hardware security module; and assign a set of unique state synchronization counter sequences to the respective set of hardware security modules, the set of state synchronization counter sequences comprising at least a first state synchronization counter sequence and a second state synchronization counter sequence and a third synchronization counter sequence.

In Example 7, the subject matter of any one of Examples 1-6 can optionally include an arrangement wherein the first set of state synchronization counter sequences comprises a first plurality of counters selected from only integers which are evenly divisible by 3 and is assigned to the first hardware security module; the second set of state synchronization counter sequences comprises a second plurality of counters selected from only integers which, when divided by 3, result in a remainder of 1, and is assigned to the second hardware security module; and the third set of state synchronization counter sequences comprises a third plurality of counters selected from only integers which, when divided by 3, result in a remainder of 2, and is assigned to the third hardware security module.

Example 8 is a computer-based method, comprising selecting, from a plurality of hardware security modules in a signing facility, a set of hardware security modules to be assigned to a digital signature process, the set of hardware security modules comprising at least a first hardware security module and a second hardware module; and assigning a set of unique state synchronization counter sequences to the respective set of hardware security modules, the set of state synchronization counter sequences comprising at least a first state synchronization counter sequence and a second state synchronization counter sequence.

In Example 9, the subject matter of Example 8 can optionally include an arrangement wherein the first set of state synchronization counter sequences comprises a first plurality of counters selected from only even integers and is assigned to the first hardware security module; and the second set of state synchronization counter sequences comprises a second plurality of counters selected from only odd integers and is assigned to the second hardware security module.

In Example 10, the subject matter of any one of Examples 9 can optionally include generating a first digital signature for a first message by applying a first hash function to a first string comprising at least one of a public key or a private key and a counter selected from the first plurality of counters.

In Example 11, the subject matter of any one of Examples 9-10 can optionally include generating a second digital signature for a second message by applying a second hash function to a second string comprising at least one of a public key or a private key and a counter selected from the first plurality of counters.

In Example 12, the subject matter of any one of Examples 9-11 can optionally include selecting one of the first hardware security module or the second hardware security module to generate a signature.

In Example 13, the subject matter of any one of Examples 9-12 can optionally include selecting a set of hardware security modules to be assigned to a digital signature process, the set of hardware security modules comprising at least a first hardware security module and a second hardware module and a third hardware security module; and assign a set of unique state synchronization counter sequences to the respective set of hardware security modules, the set of state synchronization counter sequences comprising at least a first state synchronization counter sequence and a second state synchronization counter sequence and a third synchronization counter sequence.

In Example 14, the subject matter of any one of Examples 9-13 can optionally include an arrangement wherein the first set of state synchronization counter sequences comprises a first plurality of counters selected from only integers which are evenly divisible by 3 and is assigned to the first hardware security module; the second set of state synchronization counter sequences comprises a second plurality of counters selected from only integers which, when divided by 3, result in a remainder of 1, and is assigned to the second hardware security module; and the third set of state synchronization counter sequences comprises a third plurality of counters selected from only integers which, when divided by 3, result in a remainder of 2, and is assigned to the third hardware security module.

Example 15 is a non-transitory computer readable medium comprising instructions which, when executed by a processor, configure the processor to perform operations comprising selecting, from a plurality of hardware security modules in a signing facility, a set of hardware security modules to be assigned to a digital signature process, the set of hardware security modules comprising at least a first hardware security module and a second hardware module; and assigning a set of unique state synchronization counter sequences to the respective set of hardware security modules, the set of state synchronization counter sequences comprising at least a first state synchronization counter sequence and a second state synchronization counter sequence In Example 16, the subject matter of Example 15 can optionally include the subject matter of claim 15, wherein the first set of state synchronization counter sequences comprises a first plurality of counters selected from only even integers and is assigned to the first hardware security module; and the second set of state synchronization counter sequences comprises a second plurality of counters selected from only odd integers and is assigned to the second hardware security module.

In Example 17, the subject matter of any one of Examples 15-16 can optionally include instruction to generate a first digital signature for a first message by applying a first hash function to a first string comprising at least one of a public key or a private key and a counter selected from the first plurality of counters.

In Example 18, the subject matter of any one of Examples 15-17 can optionally include instructions to generate a second digital signature for a second message by applying a second hash function to a second string comprising at least one of a public key or a private key and a counter selected from the first plurality of counters.

In Example 19, the subject matter of any one of Examples 15-18 can optionally include instructions to select one of the first hardware security module or the second hardware security module to generate a signature.

In Example 20, the subject matter of any one of Examples 15-19 can optionally include instructions to select a set of hardware security modules to be assigned to a digital signature process, the set of hardware security modules comprising at least a first hardware security module and a second hardware module and a third hardware security module; and assign a set of unique state synchronization counter sequences to the respective set of hardware security modules, the set of state synchronization counter sequences comprising at least a first state synchronization counter sequence and a second state synchronization counter sequence and a third synchronization counter sequence.

In Example 21, the subject matter of any one of Examples 15-20 can optionally include an arrangement wherein the first set of state synchronization counter sequences comprises a first plurality of counters selected from only integers which are evenly divisible by 3 and is assigned to the first hardware security module; the second set of state synchronization counter sequences comprises a second plurality of counters selected from only integers which, when divided by 3, result in a remainder of 1, and is assigned to the second hardware security module; and the third set of state synchronization counter sequences comprises a third plurality of counters selected from only integers which, when divided by 3, result in a remainder of 2, and is assigned to the third hardware security module.

Example 22 is an apparatus, comprising a computer readable memory; a signing facility comprising a plurality of hardware security modules; and a state synchronization manager comprising processing circuitry to select, from the plurality of hardware security modules, a set of hardware security modules to be assigned to a digital signature process, the set of hardware security modules comprising at least a first hardware security module and a second hardware module; assign the first hardware security module to generate digital signatures for a first sub-tree of a Merkle tree; and assign the second hardware security module to generate digital signatures for a second sub-tree of the Merkle tree.

In Example 23, the subject matter of Example 22 can optionally include the signing facility further comprising signature processing circuitry to generate a digital signature for a message by applying a hash function to a string comprising at least one of a public key or a private key and a counter.

In Example 24, the subject matter of any one of Examples 22-23 can optionally include a load balancer to select one of the first hardware security module or the second hardware security module to generate a signature.

Example 25 is a computer implemented method comprising selecting, from a plurality of hardware security modules of a signing facility, a set of hardware security modules to be assigned to a digital signature process, the set of hardware security modules comprising at least a first hardware security module and a second hardware module; assigning the first hardware security module to generate digital signatures for a first sub-tree of a Merkle tree; and assigning the second hardware security module to generate digital signatures for a second sub-tree of the Merkle tree.

In Example 26, the subject matter of Example 25 can optionally include generating a digital signature for a message by applying a hash function to a string comprising at least one of a public key or a private key and a counter.

In Example 27 the subject matter of any one of Examples 25-26 can optionally include selecting one of the first hardware security module or the second hardware security module to generate a signature.

Example 28 is a non-transitory computer readable medium comprising instructions which, when executed by a processor, configure the processor to select, from a plurality of hardware security modules of a signing facility, a set of hardware security modules to be assigned to a digital signature process, the set of hardware security modules comprising at least a first hardware security module and a second hardware module; assign the first hardware security module to generate digital signatures for a first sub-tree of a Merkle tree; and assign the second hardware security module to generate digital signatures for a second sub-tree of the Merkle tree In Example 29, the subject matter of Example 28 can optionally include instructions to generate a digital signature for a message by applying a hash function to a string comprising at least one of a public key or a private key and a counter.

In Example 30, the subject matter of any one of Examples 28-29 can optionally include instructions to select one of the first hardware security module or the second hardware security module to generate a signature.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
hardware processing circuitry to:
select, from the plurality of hardware security modules, a set of hardware security modules to be assigned to a digital signature process, the set of hardware security modules comprising at least a first hardware security module and a second hardware module;
assign a set of unique state synchronization counter sequences to the respective set of hardware security modules, the set of state synchronization counter sequences comprising at least a first state synchronization counter sequence and a second state synchronization counter sequence;
select a set of hardware security modules to be assigned to a digital signature process, the set of hardware security modules comprising at least a first hardware security module and a second hardware module and a third hardware security module; and
assign a set of unique state synchronization counter sequences to the respective set of hardware security modules, the set of state synchronization counter sequences comprising at least a first state synchronization counter sequence and a second state synchronization counter sequence and a third synchronization counter sequence, wherein:
the first set of state synchronization counter sequences comprises a first plurality of counters selected from only integers which are evenly divisible by 3 and is assigned to the first hardware security module;
the second set of state synchronization counter sequences comprises a second plurality of counters selected from only integers which, when divided by 3, result in a remainder of 1, and is assigned to the second hardware security module; and
the third set of state synchronization counter sequences comprises a third plurality of counters selected from only integers which, when divided by 3, result in a remainder of 2, and is assigned to the third hardware security module.

2. The apparatus of claim 1, wherein:
the first set of state synchronization counter sequences comprises a first plurality of counters selected from only even integers and is assigned to the first hardware security module; and
the second set of state synchronization counter sequences comprises a second plurality of counters selected from only odd integers and is assigned to the second hardware security module.

3. The apparatus of claim 2, the signing facility further comprising signature processing circuitry to:
generate a first digital signature for a first message by applying a first hash function to a first string comprising at least one of a public key or a private key and a counter selected from the first plurality of counters.

4. The apparatus of claim 2, the signing facility further comprising signature processing circuitry to:
generate a second digital signature for a second message by applying a second hash function to a second string comprising at least one of a public key or a private key and a counter selected from the first plurality of counters.

5. The apparatus of claim 1, further comprising a load balancer to:
select one of the first hardware security module or the second hardware security module to generate a signature.

6. A computer-based method, comprising:
selecting, from a plurality of hardware security modules in a signing facility, a set of hardware security modules to be assigned to a digital signature process, the set of hardware security modules comprising at least a first hardware security module and a second hardware module;

assigning a set of unique state synchronization counter sequences to the respective set of hardware security modules, the set of state synchronization counter sequences comprising at least a first state synchronization counter sequence and a second state synchronization counter sequence;

selecting a set of hardware security modules to be assigned to a digital signature process, the set of hardware security modules comprising at least a first hardware security module and a second hardware module and a third hardware security module; and assigning a set of unique state synchronization counter sequences to the respective set of hardware security modules, the set of state synchronization counter sequences comprising at least a first state synchronization counter sequence and a second state synchronization counter sequence and a third synchronization counter sequence, wherein:

the first set of state synchronization counter sequences comprises a first plurality of counters selected from only integers which are evenly divisible by 3 and is assigned to the first hardware security module;

the second set of state synchronization counter sequences comprises a second plurality of counters selected from only integers which, when divided by 3, result in a remainder of 1, and is assigned to the second hardware security module; and the third set of state synchronization counter sequences comprises a third plurality of counters selected from only integers which, when divided by 3, result in a remainder of 2, and is assigned to the third hardware security module.

7. The method of claim 6, wherein:

the first set of state synchronization counter sequences comprises a first plurality of counters selected from only even integers and is assigned to the first hardware security module; and the second set of state synchronization counter sequences comprises a second plurality of counters selected from only odd integers and is assigned to the second hardware security module.

8. The method of claim 7, further comprising:

generating a first digital signature for a first message by applying a first hash function to a first string comprising at least one of a public key or a private key and a counter selected from the first plurality of counters.

9. The method of claim 7, further comprising:

generating a second digital signature for a second message by applying a second hash function to a second string comprising at least one of a public key or a private key and a counter selected from the first plurality of counters.

10. The method of claim 6, further comprising:

invoking a load balancer to select one of the first hardware security module or the second hardware security module to generate a signature.

11. A non-transitory computer readable medium comprising instructions which, when executed by a processor, configure the processor to:

select, from a plurality of hardware security modules in a signing facility, a set of hardware security modules to be assigned to a digital signature process, the set of hardware security modules comprising at least a first hardware security module and a second hardware module;

assign a set of unique state synchronization counter sequences to the respective set of hardware security modules, the set of state synchronization counter sequences comprising at least a first state synchronization counter sequence and a second state synchronization counter sequence;

select a set of hardware security modules to be assigned to a digital signature process, the set of hardware security modules comprising at least a first hardware security module and a second hardware security module and a third hardware security module; and assign a set of unique state synchronization counter sequences to the respective set of hardware security modules, the set of state synchronization counter sequences comprising at least a first state synchronization counter sequence and a second state synchronization counter sequence and a third synchronization counter sequence, wherein:

the first set of state synchronization counter sequences comprises a first plurality of counters selected from only integers which are evenly divisible by 3 and is assigned to the first hardware security module;

the second set of state synchronization counter sequences comprises a second plurality of counters selected from only integers which, when divided by 3, result in a remainder of 1, and is assigned to the second hardware security module; and the third set of state synchronization counter sequences comprises a third plurality of counters selected from only integers which, when divided by 3, result in a remainder of 2, and is assigned to the third hardware security module.

12. The computer readable medium of claim 11, wherein:

the first set of state synchronization counter sequences comprises a first plurality of counters selected from only even integers and is assigned to the first hardware security module; and the second set of state synchronization counter sequences comprises a second plurality of counters selected from only odd integers and is assigned to the second hardware security module.

13. The computer readable medium of claim 12, comprising instructions to:

generate a first digital signature for a first message by applying a first hash function to a first string comprising at least one of a public key or a private key and a counter selected from the first plurality of counters.

14. The computer readable medium of claim 12, comprising instructions to:

generate a second digital signature for a second message by applying a second hash function to a second string comprising at least one of a public key or a private key and a counter selected from the first plurality of counters.

15. The computer readable medium of claim 11, comprising instructions to:

select one of the first hardware security module or the second hardware security module to generate a signature.

\* \* \* \* \*